US011876923B2

(12) United States Patent
Gerrity

(10) Patent No.: US 11,876,923 B2
(45) Date of Patent: Jan. 16, 2024

(54) VISUAL PRIMING OR AUGMENTATION FOR CELLPHONES

(71) Applicant: seeEVA, Inc., Brooklyn, NY (US)

(72) Inventor: Dan Gerrity, Flushing, NY (US)

(73) Assignee: seeEVA, Inc., Brooklyn, NY (US)

(*) Notice: Subject to any disclaimer, the term of this patent is extended or adjusted under 35 U.S.C. 154(b) by 0 days.

(21) Appl. No.: 18/130,986

(22) Filed: Apr. 5, 2023

(65) Prior Publication Data
US 2023/0328167 A1    Oct. 12, 2023

Related U.S. Application Data

(60) Provisional application No. 63/327,980, filed on Apr. 6, 2022.

(51) Int. Cl.
H04M 1/72427    (2021.01)
(52) U.S. Cl.
CPC .............................. *H04M 1/72427* (2021.01)
(58) Field of Classification Search
CPC ............ H04M 1/0249; H04M 1/0262; H04M 1/0277; H04M 1/72427; H04M 1/724; H04M 1/72406; H01Q 1/22; H01Q 1/24
See application file for complete search history.

(56) References Cited

U.S. PATENT DOCUMENTS

| 8,221,127 | B1* | 7/2012 | Poulsen | G09B 19/00 434/236 |
| 2002/0099454 | A1 | 7/2002 | Gerrity et al. | |
| 2003/0160700 | A1 | 8/2003 | Gerrity et al. | |
| 2008/0065273 | A1* | 3/2008 | Gerrity et al. | |
| 2017/0213476 | A1* | 7/2017 | Lynch | G09B 19/00 |
| 2018/0287246 | A1* | 10/2018 | Kim | H01Q 9/42 |
| 2021/0241424 | A1* | 8/2021 | Peuhkurinen | G09G 5/10 |
| 2021/0327026 | A1* | 10/2021 | Lebrun | G06T 5/20 |
| 2022/0067213 | A1* | 3/2022 | Lieb | G06F 18/22 |
| 2023/0083758 | A1* | 3/2023 | Di Febbo | H04N 23/66 345/557 |

OTHER PUBLICATIONS

Biederrnan, I., & Cooper, E. E. (1992). Size invariance in Visual object priming. *Journal of Experimental Psychology: Human Perception and Performance*, 18(1), 121-133.

Chalfoun, P., Frasson, C. (2010). Showing the Positive Influence of Subliminal Cues on Learner's Performance and Intuition: An ERP Study. In: Aleven, V., Kay, J ., Mostow, J. (eds) Intelligent Tutoring Systems. ITS 2010. Lecture Notes in Computer Science, vol. 6095. Springer, Berlin, Heidelberg. https://doi.org/10.1007/978-3-642-13437-1_47.

(Continued)

*Primary Examiner* — Yuwen Pan
*Assistant Examiner* — Angelica Perez
(74) *Attorney, Agent, or Firm* — Davidson., Davidson & Kappel, LLC

(57) ABSTRACT

A method for enhancing a visual display of digital information on cell phones includes providing a first visual image to the cell phone user at a display time of 10 ms or less; and providing a perceptible second visual image corresponding to the first visual image on the display. A visual augmentation method and matching game method is also provided as are cell phones.

14 Claims, 6 Drawing Sheets

(56) References Cited

OTHER PUBLICATIONS

Finkbeiner, M. Subliminal priming with nearly perfect performance in the prime-classification task. *Atten Percept Psychophys* 73, 1255-1265 (2011). https://doi.org/10.3758/s13414-011-0088-8.

Park SM, Gabrieli JD. Perceptual and nonperceptual components of implicit memory for pictures. J Exp Psychol Learn Mem Cogn. Nov. 1995;21(6):1583-94. doi: 10.1037//0278-7393.21.6.1583. PMID: 7490580.

Schmidt et al:"Visual processing in rapid-chase systems: image processing, attention, and awareness,"Review article Front. Psychol., Jul. 15, 2011, Sec. Perception Science, vol. 2—2011 | https://doi.org/10.3389/fpsyg.2011.00169.

Vorberg et al:"Different time courses for visual perception and action priming," Proc Natl Acad Sci U S A. May 13, 2003; 100(10): 6275-6280. Published online Apr. 28, 2003. doi: 10.10.1073/pnas/0931489100.

Andreas Riener, Pierre Chalfoun, Claude Frasson; The Potential of Subliminal Information Displays to Change Driver Behavior. Presence: Teleoperators and Virtual Environments 2014; 23 (1): 51-70. doi: https://doi.org/10.1162/PRES_a_00170.

\* cited by examiner

VISUAL PRIMING OR AUGMENTATION FOR CELLPHONES

This application claims priority to U.S. Provisional Patent Application No. 63/327,980, filed Apr. 6, 2022 and hereby incorporated in its entirety by reference herein. This application relates to a visual enhancement system for cellphones or electronic displays in general.

BACKGROUND

For more than a century work has progressed in the fields of psychology, neuroscience and computer vision concerning visual processing. In particular, it has been proven that even when visual stimuli are rendered consciously imperceptible through brevity of display, the stimuli provide reliable effects on subsequent recognition.

Foundationally, there exists empirical evidence that human visual perception originates outside of awareness and that these preconscious sensory sensitivities influence visual perception. As noted in various studies, this preconscious visual sensitivity is size and perspective invariant, long lasting and pre-semantic. Where consciousness is generally associated with awareness, the absence of conscious awareness is considered unconscious, or preconscious. It has been shown through studies, some of which concerned brain damage, that even in the absence of awareness visual stimuli of very brief durations resulted in predispositions that influenced subsequent recognition or response. (Biderman, 1992, Chalfoun, 2010, Finkbeiner, 2011, Rience, 2014, Schmidt, 2011, Sunghi, 1995, Vorberg, 2003, Weiskrantz 1999).

Historically, the method for displaying images at a duration brief enough to render the display consciously imperceptible was achieved by way of a device, first used in 1859, called a tachistoscope. The tachistoscope is a mechanical device for fine tuning a shutter to control display duration. During World War II the US Army Air Force used a tachistoscope in fighter pilot training as an aid in identifying enemy aircraft silhouettes. More recently, the US Air Force developed and deployed a device to display consciously imperceptible images within analog cockpit instrumentation to assist pilots in maintaining proper attitude. The device was termed a peripheral vision horizon display or PVHD.

The PVHD was calibrated by the pilot by adjusting the brightness of the horizon indication line so that it just disappears. The PVHD was intended to assist when the actual horizon is obscured by weather or darkness, and when the cockpit workload is so high that full attention cannot be given to the standard attitude instrument. The PVHD proved beneficial and was deployed in the SR-71 Blackbird, F-4 Phantom, A-10 Thunderbolt, and some helicopters.

When the US Army Air Force implemented the tachistoscope to train pilots in discerning enemy aircraft they did so by displaying aircraft silhouettes at a duration brief enough to render the display consciously imperceptible, while still having a positive effect on subsequent recognition and response. Rather than display a detailed image, or colorful image, the training was carried out by display of a monochrome silhouette that depicted the aircraft contours and contrast. Many years later, it is now known through research in the field of computer vision that the image features of contours and contrast are perspective and size invariant, and most relevant for object identification.

In modern digital circumstance this distillation of the original image to its perspective and size invariant monochrome features of contours and contrast also provides a means to reduce image data size and thereby facilitate processing. As described below under Control System, distilling digital images to contours and contrast is achieved through mathematical filters executed as software code. Similarly, displaying a digital image at a duration rendering the display consciously imperceptible is possible by controlling the digital display through software. The system described herein renders the display of an image consciously imperceptible for purpose of as a positive effect on subsequent recognition. This is realized by first distilling the image data for a digital representation of its contours and contrast and then displaying this image data at a duration brief enough to render the display consciously imperceptible with additional control of contrast saturation, luminosity and position frame to frame (Visual Priming).

At a neurological level, Visual Priming occurs as a result of the plasticity of the neural connections leading to and within the brain that form a memory; consciously imperceptible exposure results in a neurologically embedded memory in the ever fluid arrangement of neurons comprising the neural visual pathway. Not a memory that can be recalled but a memory that nonetheless facilities subsequent recognition of visually related (similar with respect to contours and contrast) images thereby improving recognition and response time.

As Visual Priming resides outside of awareness it is pre-semantic. That is, images to which an individual experiences Visual Priming carry no meaning. Display of a consciously imperceptible image is no more than an image to the unconscious mind. Words have no meaning. However, images that are familiar, even if unknowingly, are more readily recognizable and there is therefore a utility resulting from improved recognition and response time. As a corollary, what is familiar is usually comfortable and comfort is usually accompanied by acceptance.

Visual Priming is an anticipatory process where a viewer gains a familiarity with an image through a consciously imperceptible display, followed by a consciously perceptible display of visually related image for the positive effect of improving recognition and response time. Complementary to Visual Priming, concurrent display of both a consciously imperceptible and consciously perceptible object image also results in a positive effect on recognition and response time. This contemporaneous display of a consciously imperceptible and consciously perceptible object image is also a function of the Display Controller (described below under Control System) where the Display Controller additionally manages frequency separation between the concurrent consciously imperceptible and consciously perceptible object image display (Visual Augmentation).

SUMMARY OF THE INVENTION

With respect to cellphones, implementation of OLED displays beginning in 2022 has made Visual Priming and Visual Augmentation on cellphones technically feasible. Digital displays, such as LCD and LED consist of a backlight and that physical architecture limited the display pixel response time such that refresh rates specified by manufacturers were not realizable. For example, a 240 Hz (4 ms) refresh rate display with a 16 ms response time was limited to a display duration no less than 16 ms, or a refresh rate of 60 Hz (1,000 ms/16.67 ms). Visual Priming or Visual Augmentation requires a display duration (less than 10 ms, and 8 ms or less being preferabe) and as such was not technically feasible on LCD or LED displays. OLED however is self-emitting and has a response time of 1 ms, thus supporting Visual Priming and Visual Augmentation. Prior to OLED, neither Visual Priming nor Visual Augmentation was possible on a cellphone, or, for the same reason, any other earlier generation digital display.

The present invention provides a method for enhancing a visual display of digital information on cell phones comprising: providing a first visual image to the cell phone user at a display time of 10 ms or less; and providing a second perceptible visual image corresponding to the first visual image on the display.

A perceptible visual image as defined herein is one in which a user perceives the image as an image, or "sees" the image. Such perceptibility generally occurs with a display duration is greater than 10 ms and certainly for 16 ms or greater. The image is typically repeated at a refresh rate for continuous display.

Preferably, the first visual image is a distillation of the second visual image, derived for example from a bandpass filter or Gaussian transform with the visual image as an input.

The first visual image can be provided prior to showing the second visual image, but also concurrently with the second visual image. Preferably, if shown concurrently, the first and second visual images are located at a same location on a display of the cell phone.

Preferably, the cell phone has an OLED display.

Preferably, the display time of the visual priming image is less than 10 ms, and most preferably 8 ms or less The present invention also provides a method for visual augmentation comprising: providing a perceptible visual image on the display; and providing concurrently a distilled visual image to the cell phone user corresponding to the visual image repeatedly at a display time greater than 10 ms and certainly for 16 ms or greater.

Preferably the distilled visual image for visual augmentation is provided at a same location on a display as the visual image.

The present invention also provides a matching game for cell phone users comprising: visually priming or augmenting at least one of a plurality of images and not visually priming or augmenting another of the plurality of images, providing the plurality of images to a cell phone, and allowing a user to select one of the plurality of images, and determining if the selected one of the plurality of images corresponds to the visually primed or augmented image.

Preferably, a second user selects the at least one image that is visually primed or augmented, and the user is informed if the selected image corresponds to the visually primed or augmented image.

The present invention also provides cell phones running the above methods.

BRIEF DESCRIPTION OF THE DRAWINGS

The figures describe preferred embodiments of the present invention, in which.

DETAILED DESCRIPTION

Figure 1:
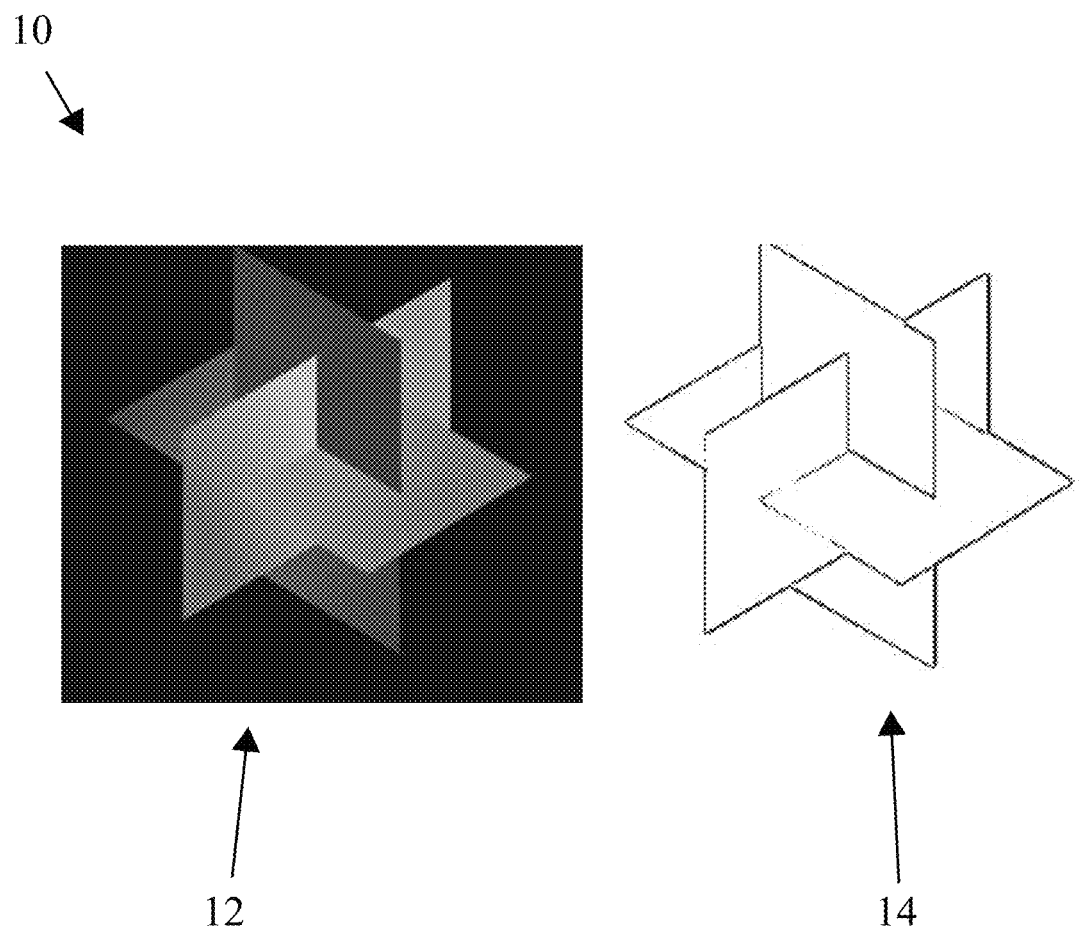
FIG. 1 shows a distillation module schematically.

FIG. 1 describes schematically a Distillation Module 10 of a cellphone 60, shown schematically. Distillation Module 10 mathematically filters image data of an object image 12 to distill from the data a digital description of the perspective and size invariant features of contours and contrast. These distilled features comprise the image data to create a distilled image 14 for Visual Priming or Visual Augmentation as further conditioned by a Display Controller 20 shown in FIG. 2. Various methods exist to distill contours and contrast from image data, such as a Bandpass Filter or Gaussian Derivates Herbert Transform, both of which are common in computer vision systems where computers are trained to identify objects.

Figure 2:
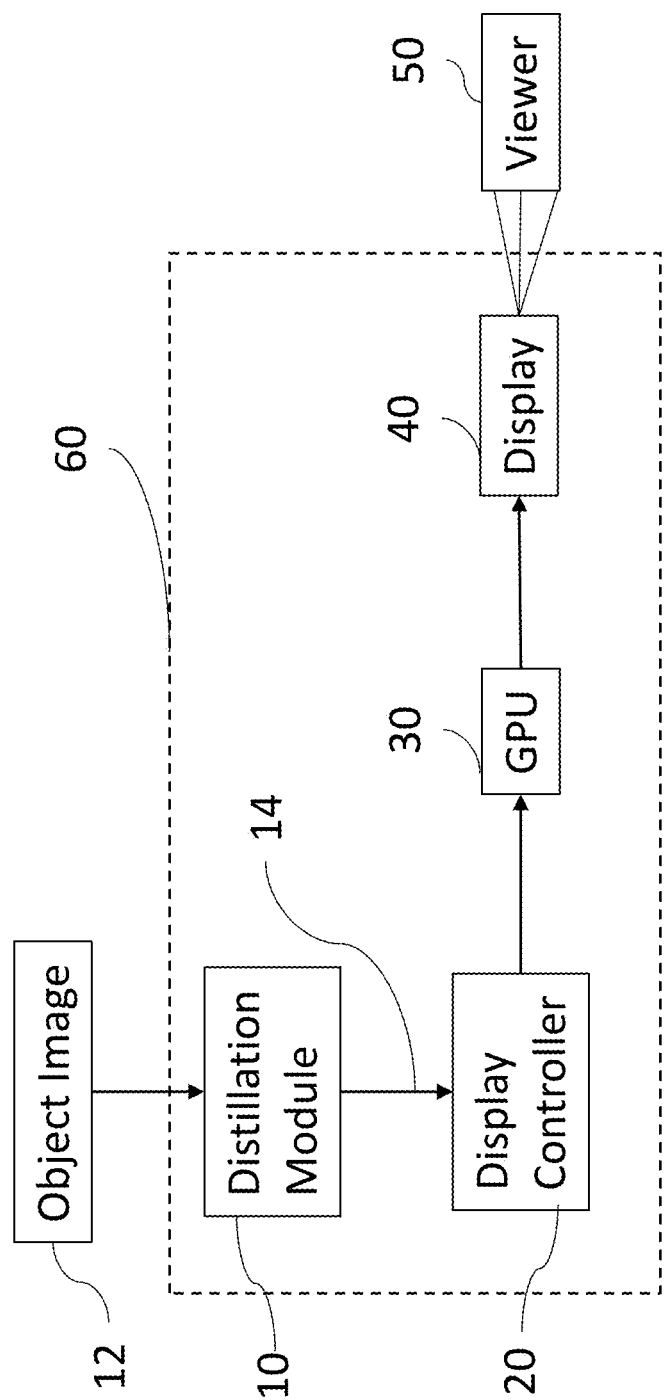
FIG. 2 shows a cellphone schematically receiving an object image (for example via a camera)

For Visual Priming, as depicted in FIG. 2 below, from the reduced image data provided by the Distillation Module 10, the Display Controller 20 controls a frame rate and display refresh rate for indirect control of display response time as a method of constraining a display duration to less than 10 ms, for example 8 ms, as well as controlling contrast saturation, luminosity and position frame to frame.

As shown in FIG. 2, the object image 12 passed to Distillation Module 20 which provides a distilled image 14 to display controller 20. A GPU 30 controls display 40 to provide the distilled image to a viewer 50 as will be described hereafter, for Visual Priming.

Figure 3:
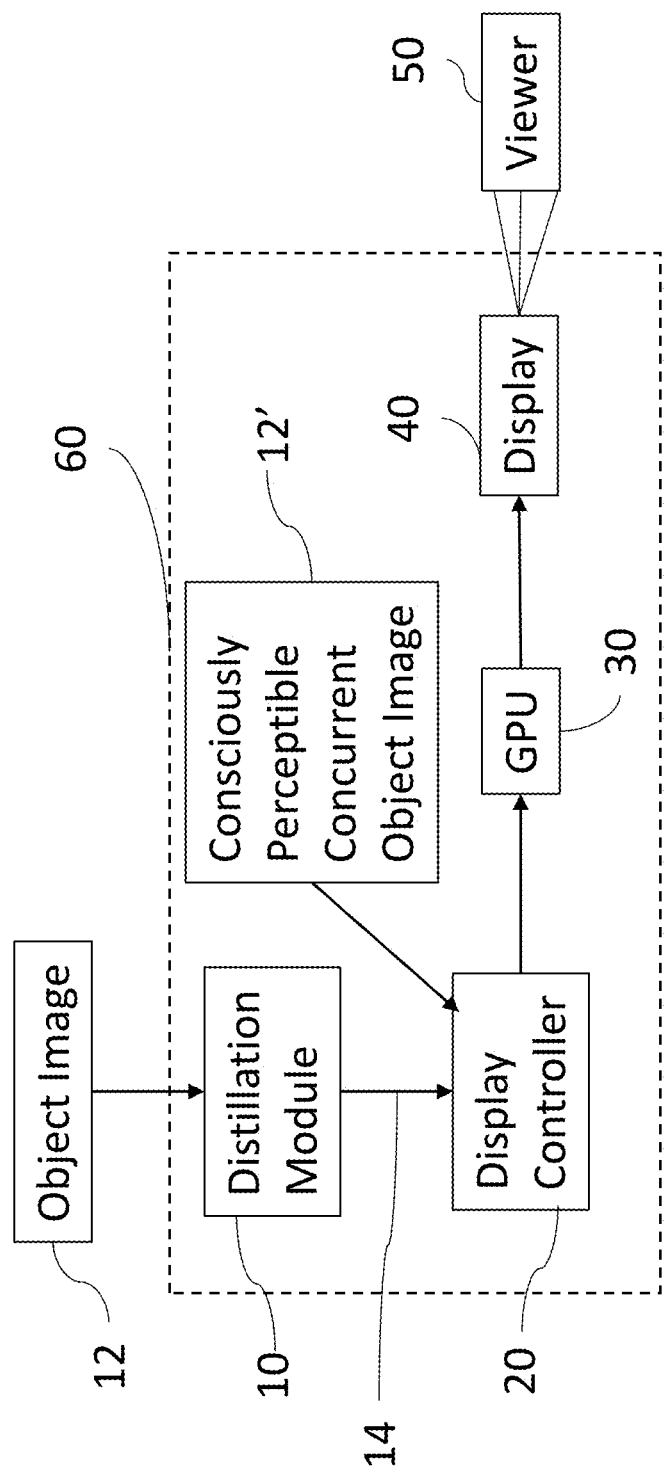
FIG. 3 shows a cellphone for Visual Augmentation in which a concurrent object image is stored.

For Visual Augmentation, as depicted in FIG. 3, from the reduced image data provided by the Distillation module, the Display Controller 20 controls frame rate and display refresh rate for indirect control of display response time as a method of constraining display duration less than ms, as well controlling contrast saturation, luminosity and position frame to frame. Additionally, the Display Controller 20 maintains frequency separation at the display 40 between a concurrent consciously imperceptible and a consciously perceptible object image 12'. Image 12' may be the same as object image 12 or similar.

For further control and refinement, the Display Controller could include an error signal for measuring deviation between intended display specifications and actual display specifications as well as an error signal for measuring deviation between intended user response and actual user response, for backpropagation through neural networks as a method of minimizing display control errors as well as learning specific user's visual sensory sensitivities.

The overarching application under consideration is Visual Priming and Visual Augmentation on a cellphone for the purpose of having a positive effect upon image recognition and response time.

The table below lists preferred embodiment applications for Visual Priming and/or Visual Augmentation.

| Cellphone Application | Visual Priming | Visual Augmentation |
|---|---|---|
| Matching Game | ✓ | ✓ |
| Gaming Enhancement | ✓ | ✓ |
| Advertising Enhancement | N/A | ✓ |

As discussed above under Background, recent display technology advances have opened an opportunity for Visual Priming and Visual Augmentation on a cellphone, or any OLED display with response time of less than 10 ms.

Beginning in 2022, mainstream phones, such as Samsung Galaxy S21 and Apple iPhone 13 Pro Max, have an OLED display with sufficiently fast response time to support Visual Priming or Visual Augmentation.

Three preferred embodiments are described below.

Matching Game Embodiment

Visual Priming on a cellphone makes possible an interactive multiuser matching game. In this application example there are two users: User A and User B, both of which use a Samsung Galaxy S21 Ultra cellphone having an OLED display with refresh rate of 120 Hz and response time of 2 ms for an effective display duration of 8.3 ms (1,000 ms/120 Hz). An image array is displayed for User A (Image Array) from which User A selects one image through contact with the cellphone display or through a feature such as Samsung Smart Scroll eye-tracking software to determine focal orientation within the Image Array (Match Image).

User B is then Visually Primed to the Match Image. Subsequent to Visual Priming of User B to the Match Image, the same Image Array earlier presented to User A is presented to User B, from which User B selects an image based on what is most familiar. While seemingly random to both User A and User B, User B is predisposed to the Match Image through Visual Priming. User A and User B remain unaware of the method by which their images choices are matched.

Figure 4:
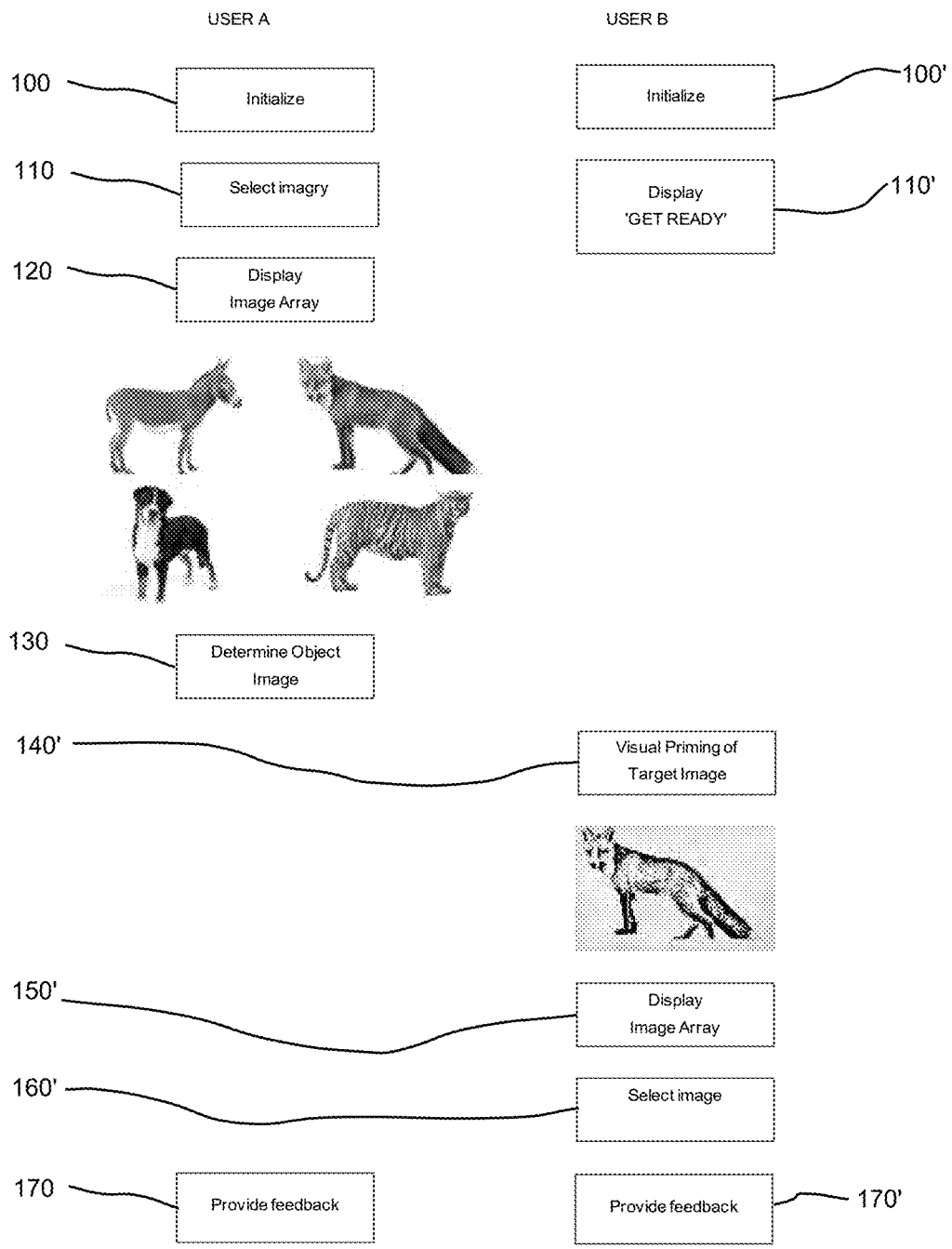
FIG. 4 shows a flowchart of a matching game embodiment.

For example, referring to FIG. 4, the game is initialized at step 100, and a choice of imagery, such as animals, or plants or well-known buildings is provided. Here the User A selects animals at step 110, and a grid of four animal images is displayed to User A at step 120, from which User A selects the Fox. The Fox image is then sent to User B whose phone is initialized in step 110' and User B is informed at step 110' that the game is to begin. The Fox image is processed through the Distillation Module and Display Controller for Visual Priming of User B to the Selected Image. During Visual Priming, or predisposing, User B to the Fox image at step 140', the distilled image is shown imperceptibly to User B. The entire perceptible Image Array (see step 120 for User A) is displayed to User B at step 150' for selection of an image in step 160' from the Image Array based on what was is most familiar.

Empirical data from various psychological and neurological studies show that Visual Priming increases identification accuracy by about 40%. As such the probability of User B selecting the same image as User A in this four image example is better than chance (25%) and the matching rate is estimated at 65%. In steps 170 and 170' each of User A and User B can be informed of the choice, likely the Fox. Both Users can thus know that the visual priming was effective. Visual Augmentation is also possible with the matching game in which the steps 140' and 150" occur simultaneously.

Commercially, if one tenth of 1% of the current 5.3 billion cellphones download this application, and there were 10 resulting advertising impression displayed per month per user, at $0.05/advertising impression then this application has an annual revenue potential of approximately $31.80 million (5.3 billion×0.1%×10×12×$0.05)

Here again is the flow for the FIG. 4:

100, 100': Application is initialized for both users.

110: User A selects an image category. In this example the image category is Animals. Categories could be anything including animate, inanimate, real or fictional.

110' User B is infomed to get ready.

120: Image Array is displayed to User A.

130: Determination is made as to User A's image of interest within the Image Array. Determination could occur by User A selecting a specific image on a touch screen or through data collected from, for example, the Samsung Smart Scroll feature to determine User A's focus with respect to specific imagery within the Image Array (Match Image).

140': Match Image is passed to the Distillation Module for mathematical filtering of image data for a digital representation of Match Image contours and contrast. The resulting image data is then passed to the Display Controller for control of frame rate and display refresh rate for indirect control of display response time and display duration as well as controlling contrast saturation, luminosity and position frame to frame for Visual Priming of User B to the Match Image.

150': Consciously perceptible Image Array is presented to User B with prior instructions to choose the most familiar image.

160': User B selects from the Image Array, through contact with a touch screen, the Fox for a positive match with the image selected by User A.

170, 170': Feedback is provided to User A and User B on match rate between their respective image selections.

Gaming Enhancement Embodiment

Many games have images of particular interest within play and these images occur in a fast-paced setting that is often visually overloaded, similar in ways to an airplane cockpit. Gaming Enhancement is an application of Visual Priming and/or Visual Augmentation to a cellphone with an OLED display, or any device with an OLED display. For example, in the game PlayerUnknown's Battlegrounds, there are game objects to find which are helpful in the game play: assault rifles, a backpack, a bulletproof vest, healing items, and a helmet (Gaming Images). Recognizing and responding to these Gaming Images advances the level of play. Visual Priming and/or Visual Augmentation assists gamers by having a positive effect upon game image recognition and response time thereby advancing the game play and in turn enhancing the gaming experience.

As described above under Background, visual stimuli may remain consciously invisible but nevertheless produce reliable effects on subsequent recognition. Further, and of particular interest to gamers, Visual Priming and Visual Augmentation operate outside of awareness, thereby not adding to cognitive load which is particularly helpful in visually loaded situations such as gaming. Additional visual load would be distracting and thereby deleterious to the gaming experience. Based on empirical results from numerous studies of visual perception, Visual Priming results in a general reaction time improvement of approximately 390 ms. As such the positive effect of Gaming Enhancement is improved response speed for improving the gaming performance and experience.

Commercially, if 1% of the current worldwide gaming community of 3.2 billion users download this Gaming Enhancement application, and each download yielded an annual licensing revenue of $3 then this application has an annual revenue potential of approximately $96 million (3.2 billion×1%×$3).

Figure 5:
FIG. 5 shows a flowchart of a gaming enhancement embodiment.

FIG. 5 shows a Gaming Enhancement flowchart for each of Visual Priming and Augmentation

100": Application is initialized.

110": Specific game is selected to initialize images of importance (Gaming Images).

120": For Visual Priming, sequentially, Gaming Images are passed to the Distillation Module for mathematical filtering of image data for a digital representation of Gaming Images' contours and contrast. The resulting image data is then passed to the Display Controller for control of frame rate and display refresh rate for indirect control of display response time and display duration as well as controlling contrast saturation, luminosity and position frame to frame for Visual Priming of gamer to the Gaming Images. In this example there is one Gaming Image: the Rifle.

For Visual Augmentation user starts game play without Visual Priming.

130": For Visual Priming, game play follows Visual Priming of gamer to Gaming Image.

For Visual Augmentation, application monitors gaming application for Gaming Image passed from the CPU to GPU for rendering (Rifle in this example). Upon identification of a Rifle image passed to GPU, the Rifle image is passed to the Distillation Module for mathematical filtering of data describing the Rifle's contours and contrast. The resulting image data is then passed to the Display Controller for control of frame rate and display refresh rate for indirect control of display response time and display duration as well as controlling contrast saturation, luminosity and position frame to frame; additionally, the Display Controller maintains frequency separation between the consciously imperceptible and consciously perceptible display to provide Visual Augmentation of Rifle image for the gamer.

140": For both Visual Priming and Visual Augmentation, gamer has improved reaction time to the Rifle image of approximately 390 ms.

150": In general, a gamer experiences enhanced game play through improved reaction time to Gaming App Images to which they have been previously predisposed through Visual Priming or concurrently disposed through Visual Augmentation.

Advertising Enhancement Embodiment

Figure 6:
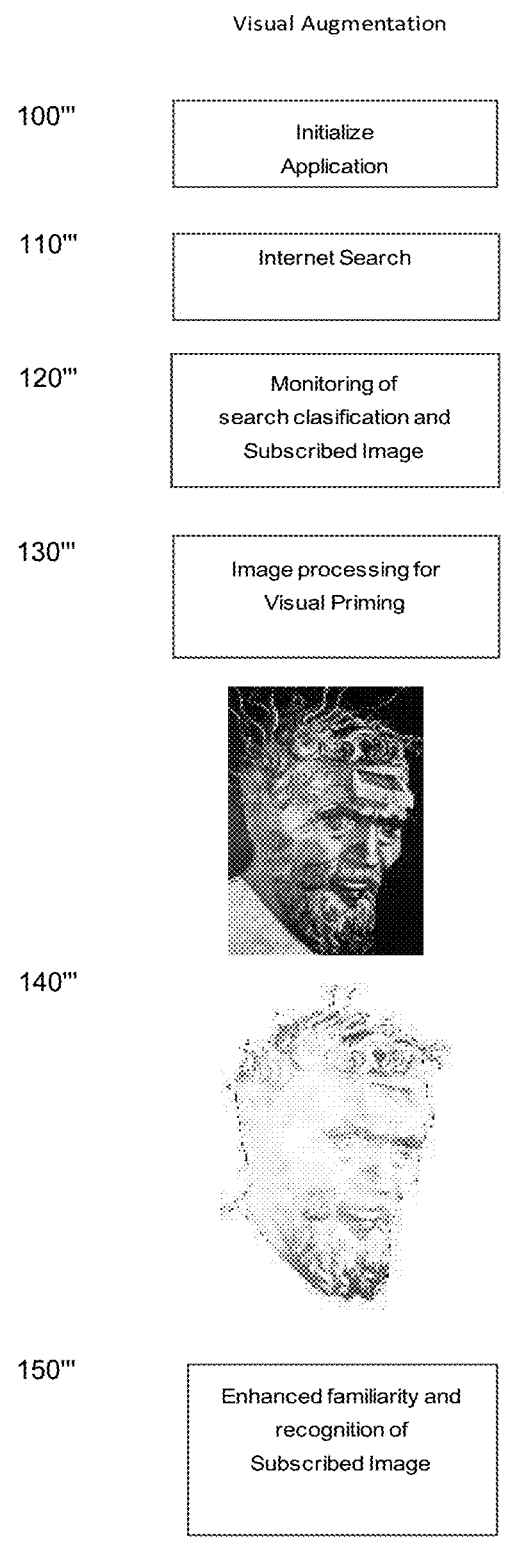
FIG. 6 shows a flowchart of an advertising enhancement embodiment.

Globally, as of 2022 there are 5.16 billion Internet users. Annually there are 1.20 trillion Internet searches. Internet searches for research about consumer items is commonplace. FIG. 6 depicts a Google search for consumer electronics in which the search results include associated logos.

Given the size of the user base, there is enormous commercial potential for Advertising Enhancement applied to cellphones, or devices in general, having OLED or response time equivalent displays.

For example, if an Internet user were disposed to specific logos through Visual Augmentation, such as those included within Internet search results, with the positive result of increasing the likelihood that the Internet user selects the search result link associated with Visual Augmentation of the logo, then there is value in the increased likelihood of a user selecting a specific link. Empirical studies in the fields of neurology and psychology have demonstrated that Visual Priming results in a twofold increase in the likelihood that that an individual will select a specific image after Visual Priming for same. By the same method, an Internet user will select a specific link based on Visual Priming of the associated logo. Visual Augmentation has similar positive effect upon image selection, so the likelihood of an Internet user selecting a link based on Visual Augmentation of the associated logo is similarly increased twofold.

As a business, Advertising Enhancement is a subscription-based model. Internet browsers, such as Chrome and Safari, employ cookies to collect Internet user data to develop profiles for the purpose of targeted advertising. Advertising Enhancement is a cookie-like service paid for by companies to optimize their advertising. Referring to the example of FIG. 6, an Internet user searches for visual enhancement software and the search results includes seeEVA with the seeEVA logo preceding the link. Display of a consciously imperceptible seeEVA logo through Visual Augmentation increases by twofold the likelihood of an Internet user selecting the link associated with the seeEVA logo.

Commercially, $288 billion was spent on mobile digital advertising worldwide during 2021. If Advertising Enhancement applied to cellphones captures one tenth of one percent (0.1%) of the mobile digital advertising market, then the application has an annual revenue potential of approximately $288 million ($288 billion×0.1%).

An Advertising Enhancement flowchart for FIG. 6 is as follows:

100'": Application is initialized.

110'": User performs Internet search.

120'": Application monitoring of search terms for predefined association between search terms and associated subscribed logos. For example, if the search term was visual enhancement, and seeEVA was a subscriber then the subscribed seeEVA logo is passed to the Control System for Visual Augmentation.

130'": seeEVA Logo is passed to the Distillation Module for mathematical filtering of image data for a digital representation of seeEVA Logo contours and contrast. The resulting image data is then passed to the Display Controller for control of frame rate and display refresh rate for indirect control of display response time and display duration as well as controlling contrast saturation, luminosity and position frame to frame; additionally, the Display Controller maintains frequency separation between the consciously imperceptible and consciously perceptible display to provide Visual Augmentation of the seeEVA Logo.

140'" Concurrent displays of consciously perceptible and consciously imperceptible seeEVA Logo.

150'": Twofold increased likelihood of Internet user selecting seeEVA link, when shown for example in a Google search list.

What is claimed is:

1. A method for enhancing a visual display of digital information on a cell phone used by a cell phone user, the method comprising:

creating and storing, by the cell phone, distilled image of an object image;

using a display controller to control a frame rate and display time to less than 10 ms;

providing the display controller with a perceptible visual image of the object image;

providing the distilled image to the cell phone user at the display time of 10 ms or less;

providing the perceptible visual image corresponding to the distilled visual image to the cellphone user at the display time greater than 10 ms;

providing on the display at least one different perceptible visual image not corresponding to the distilled visual image;

allowing the cellphone user to select between the perceptible visual image corresponding to the distilled visual image and the at least one different perceptible visual image;

determining if the cellphone user has selected the perceptible visual image or the at least one different perceptible image so as to determine if the user has matched the distilled image or not; and using the display controller to further refine an effectiveness of the cellphone user in selecting the perceptible visual image of the object image as opposed to selecting the at least one different perceptible visual image.

2. The method as recited in claim 1 wherein the distilled visual image is derived from a bandpass filter or Gaussian transform with the object image as an input.

3. The method as recited in claim 1 wherein the distilled and perceptible visual images are located at a same location on a display of the cell phone.

4. The method as recited in claim 1 wherein the cell phone has an organic light-emitting diode (OLED) display.

5. The method as recited in claim 1 wherein the display time of the first visual image is 8 ms or less.

6. A cell phone running the method as recited in claim 1.

7. The method as recited in claim 1 wherein the cellphone user is provided feedback as to whether the cellphone user has selected the perceptible visual image or the at least one different perceptible image.

8. The method as recited in claim 1 wherein the at least one different perceptible image includes a plurality of the different perceptible images.

9. The method as recited in claim 1 wherein the refining of the effectiveness includes providing an error signal for measuring deviation between intended display specifications and actual display specifications.

10. The method as recited in claim 1 wherein the refining of the effectiveness includes providing an error signal for measuring deviation between intended user response and actual user response.

11. The method as recited in claim 10 wherein the error signal for measuring deviation between intended user response and actual user response is backpropagated to a neural network.

12. The method as recited in claim 10 wherein the backpropagation to the neural network is used to minimize display control errors.

13. The method as recited in claim 10 wherein the backpropagation to the neural network is used to learn visual sensory sensitivities of the cellphone user.

14. The method as recited in claim 1 wherein the refining of the effectiveness includes learning visual sensory sensitivities of the cellphone user.

* * * * *